Purches Miles
Improvement in Sausage Stuffers.

No. 73453
Patented Jan 21 1868

Witnesses
Geo. D. Walker
Chs. H. Smith

Purches Miles

United States Patent Office.

PURCHES MILES, OF NEW YORK, N. Y., ASSIGNOR TO THEODORE MACE, OF THE SAME PLACE.

Letters Patent No. 73,453, dated January 21, 1868.

IMPROVED SAUSAGE-STUFFER.

The Schedule referred to in these Letters Patent and making part of the same.

TO ALL WHOM IT MAY CONCERN:

Be it known that I, PURCHES MILES, of the city and State of New York, have invented, made, and applied to use, a certain new and useful Improvement in Sausage-Stuffers; and I do hereby declare the following to be a full, clear, and exact description of the said invention, reference being had to the annexed drawing, making part of this specification, wherein—

Similar marks of reference denote the same parts.

Figure 1:
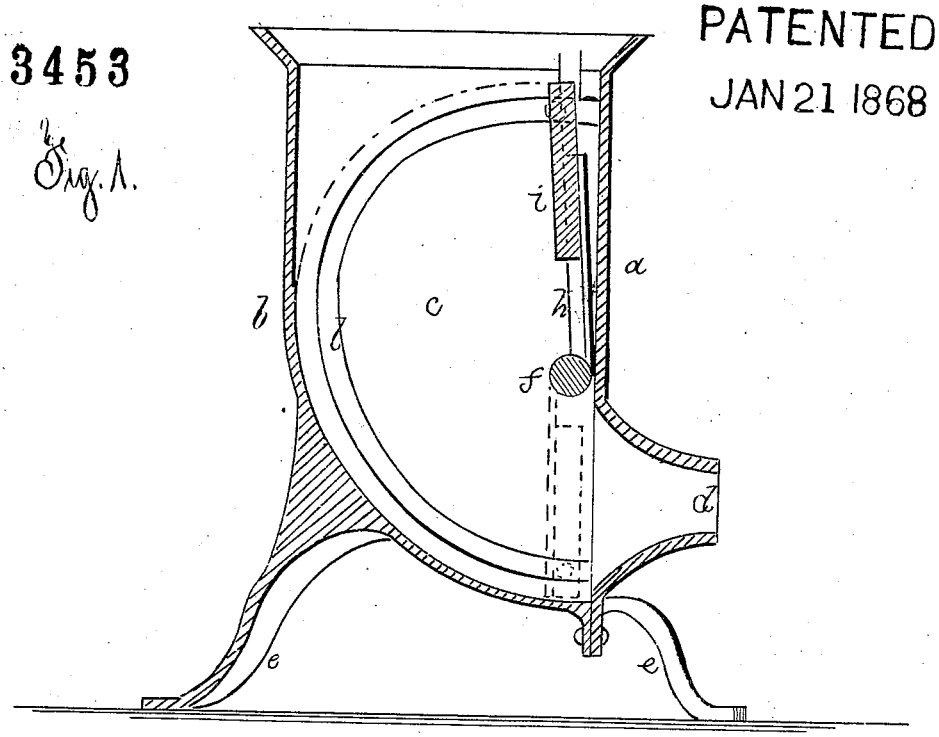
Figure 1 is a vertical section of the said stuffer.
Figure 2:
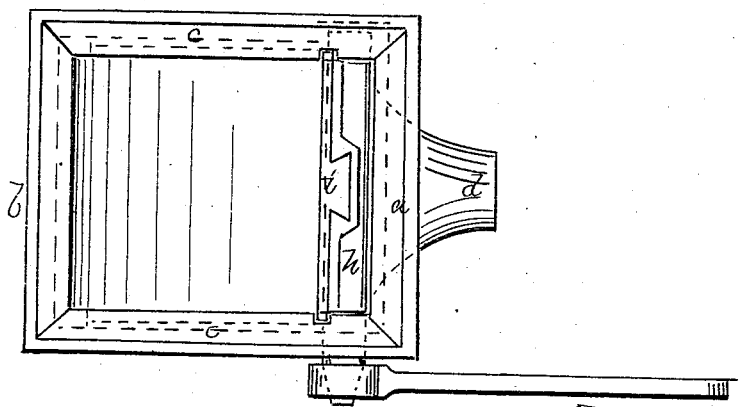
Figure 2 is a plan of the same.

In sausage-stuffers heretofore made, a swinging paddle has been employed in a segmental case, and also a swinging piston, acting in a curved case; but in these stuffers the space filled by the paddle or piston was the same at both ends of its stroke, and there was no concentrating or squeezing action by the piston itself, resulting from the same being contracted into a smaller chamber; hence the space for receiving the meat was too much contracted, and the hopper near the spout was too large.

The nature of my said invention consists in a double piston, that is swung on an axis, and one part slides on the other, in combination with a hopper, contracted towards the point of delivery of the meat, and provided with ribs or grooves, that control the movement of the sliding portion of the piston, so that said piston passes over and grasps the meat placed in the hopper, and rapidly concentrates the same into a smaller space, and forces it out through the nozzle or spout. By this construction I am enabled to operate on a larger amount of meat, and with greater rapidity, in proportion to the size of the apparatus, than heretofore.

In the drawing, $a$ is the vertical side, $b$ the curved side, and $c\ c$ the ends of the hopper. $d$ is the tapering nozzle for receiving the sheet-metal stuffing-tube, and $e\ e$ are legs supporting the stuffer. The plates forming this hopper are to be bolted or riveted together at the angles. The axis $f$ of the piston is introduced in bearings formed for it in the side $a$ and ends $c\ c$, and projects to receive a crank or lever, $g$, by which it is moved. $h$ is the standing portion of the piston, and $i$ the sliding part, fitted with a V rib and slide, and with lugs at the angles, entering elliptical grooves $l$, in the end plates $c\ c$.

It will now be seen that the piston $h\ i$, when in the position shown in the drawing, is contracted, the part $i$ being slid towards the axis $f$; but as the piston is turned on its axis, the portion $i$ is slidden out by the grooves $l$ acting on the lugs, and thus the piston is increased in area to pass over and grasp the meat contained in the hopper. The movement of the piston quickly concentrates the loose mass of meat, and the same is compressed and forced out of the nozzle, the space for the meat being constantly lessened in width by the contraction of the hopper, the piston accommodating itself thereto by sliding in, until the parts occupy the contracted form shown in fig. 1 by red lines.

What I claim, and desire to secure by Letters Patent, is—

The swinging double piston, the one part sliding on the other, in combination with the hopper, contracted as and for the purposes set forth.

I also claim the elliptical grooves or ribs $l$, in combination with the hopper and sliding and swinging piston, as and for the purposes set forth.

In witness whereof, I have hereunto set my signature, this ninth day of August, A. D. 1867.

PURCHES MILES.

Witnesses:
 THOS. GEO. HAROLD,
 CHAS. H. SMITH.